United States Patent
Ogawa et al.

(10) Patent No.: US 10,767,582 B2
(45) Date of Patent: Sep. 8, 2020

(54) VEHICLE CONTROL DEVICE

(71) Applicant: Mazda Motor Corporation, Aki-gun, Hiroshima (JP)

(72) Inventors: Daisaku Ogawa, Hiroshima (JP); Daisuke Umetsu, Hiroshima (JP); Osamu Sunahara, Hiroshima (JP); Yasunori Takahara, Hiroshima (JP); Yuichiro Akiya, Hiroshima (JP); Chikako Ohisa, Aki-gun (JP); Atsushi Yamasaki, Hiroshima (JP); Keiichi Hiwatashi, Aki-gun (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 275 days.

(21) Appl. No.: 15/901,697

(22) Filed: Feb. 21, 2018

(65) Prior Publication Data

US 2018/0266346 A1 Sep. 20, 2018

(30) Foreign Application Priority Data

Mar. 17, 2017 (JP) ................................ 2017-052426

(51) Int. Cl.
*F02D 41/00* (2006.01)
*B60W 10/06* (2006.01)
(Continued)

(52) U.S. Cl.
CPC ......... *F02D 41/0087* (2013.01); *B60W 10/06* (2013.01); *B60W 10/10* (2013.01); *B60W 30/045* (2013.01); *B60W 30/18145* (2013.01); *F02D 37/02* (2013.01); *F02D 41/0002* (2013.01); *F02D 41/021* (2013.01); *B60W 2510/06* (2013.01); *B60W 2510/0638* (2013.01); *B60W 2510/20* (2013.01); *B60W 2710/0666* (2013.01); *B60W 2710/10* (2013.01);
(Continued)

(58) Field of Classification Search
CPC ... F02D 41/0087; B60W 10/06; B60W 10/10; B60W 30/045
See application file for complete search history.

(56) References Cited

U.S. PATENT DOCUMENTS 10,082,124 B2 * 9/2018 Hiwatashi ................. F01N 3/10
10,202,039 B2 * 2/2019 Ujihara ................. B60K 28/16
(Continued)

FOREIGN PATENT DOCUMENTS

JP 2014166014 A 9/2014

*Primary Examiner* — Kevin A Lathers
(74) *Attorney, Agent, or Firm* — Alleman Hall Creasman & Tuttle LLP

(57) ABSTRACT

A vehicle control device is provided, which includes an engine, an engine control mechanism configured to control torque generated by the engine, and a processor configured to execute a vehicle attitude controlling module to perform a vehicle attitude control in which the engine control mechanism is controlled to reduce the torque so as to decelerate the vehicle, when a condition that the vehicle is traveling and a steering angle related value that is related to a steering angle of a steering device increases is satisfied, and a preventing module to prevent a combustion frequency of the engine per unit time from falling below a given value while the vehicle attitude controlling module executes the vehicle attitude control.

20 Claims, 10 Drawing Sheets

(51) Int. Cl.
*B60W 10/10* (2012.01)
*B60W 30/18* (2012.01)
*B60W 30/045* (2012.01)
*F02D 37/02* (2006.01)
*F02D 41/02* (2006.01)

(52) U.S. Cl.
CPC .. *B60W 2720/00* (2013.01); *B60Y 2300/1815* (2013.01); *F02D 2200/101* (2013.01); *F02D 2250/18* (2013.01)

(56) References Cited

U.S. PATENT DOCUMENTS

| | | | |
|---|---|---|---|
| 10,220,837 B2 * | 3/2019 | Takahara | B60W 30/02 |
| 2002/0007236 A1 * | 1/2002 | Sadano | B62D 1/28 |
| | | | 701/28 |
| 2002/0032512 A1 * | 3/2002 | Shimada | B60K 6/48 |
| | | | 701/89 |

\* cited by examiner

VEHICLE CONTROL DEVICE

TECHNICAL FIELD

The present disclosure relates to a vehicle control device, and particularly to a vehicle control device which achieves a desired vehicle attitude (vehicle behavior) by performing an engine control.

BACKGROUND OF THE DISCLOSURE

Conventionally, devices which control the behavior of a vehicle to a safer direction when the behavior of the vehicle becomes unstable due to a slip, etc. (such as an antiskid brake system (ABS)) are known. For example, devices which detect that behavior such as understeering or oversteering occurs in the vehicle during cornering, etc. of the vehicle, and apply a suitable deceleration to the vehicle so that the behavior is controlled are known.

Meanwhile, vehicle movement controllers are known, which adjust a deceleration during cornering to control loads applied to front wheels which are steerable wheels so that a series of operations by a vehicle driver (breaking, steering-in, accelerating, steering-back, etc.) during cornering of a vehicle in a normal traveling state become natural and stable, unlike the above control performed for safety improvement in the traveling state where the behavior of the vehicle becomes unstable.

Further, JP2014-166014A discloses a behavior control device for a vehicle which reduces a driving force (torque) of the vehicle according to a yaw-rate related amount which corresponds to a steering operation by a vehicle driver (e.g., yaw acceleration) to quickly decelerate the vehicle when the driver starts the steering operation, so that a sufficient load is quickly applied to front wheels which are steerable wheels. According to this behavior control device, since the loads are quickly applied to the front wheels when the steering operation is started, a frictional force between the front wheels and a road surface increases, and a cornering force of the front wheels increases. Therefore, tunability of the vehicle in an early stage of curve entry improves, and a response to the steering-in operation (steering stability) improves. Thus, a vehicle behavior intended by the driver is achieved.

Conventionally, to reduce fuel consumption, arts for changing an operation mode of a multi-cylinder engine between an all-cylinder operation and a reduced-cylinder operation according to an operating state of a vehicle (i.e., cylinder deactivation engine) are known. In the all-cylinder operation, combustion of a mixture gas is performed in all cylinders, and in the reduced-cylinder operation, the combustion of the mixture gas in one or some of the cylinders is suspended. In the reduced-cylinder operation of such an engine where the reduced-cylinder operation is performable (i.e., cylinder deactivation engine), the combustion in some of the cylinders of which the order of combustion is not successive is prohibited, and the combustion in the other cylinders is sequentially performed. Therefore, a combustion time interval in the reduced-cylinder operation is longer than that in the all-cylinder operation.

For this reason, in a case where the behavior control device of JP2014-166014A is applied for the cylinder deactivation engine and reduces an engine torque to decelerate the vehicle according to the steering operation by the driver (executes a vehicle attitude control), a response time from issuance of a torque reduction request until an actual start of the vehicle attitude control upon reaching for the first time a combustion timing of the cylinder after the request issuance, varies between the all-cylinder operation and the reduced-cylinder operation. Therefore, when the vehicle attitude control is performed in the reduced-cylinder operation, the response of the torque reduction by the vehicle attitude control tends to be worse than when the vehicle attitude control is performed in the all-cylinder operation. As a result, various time delays occur, such as a timing at which the cornering force of the front wheels increases due to the torque reduction and a timing at which a reactive force of a steering wheel increases in accordance with the cornering force increase, and a desired vehicle attitude during a turn is not achieved and the driver feels a sense of discomfort.

Note that this response degradation, which is described above to occur in the reduced-cylinder operation of the cylinder deactivation engine, also tends to occur in an engine operating condition where the number of times that the combustion is performed (combustion frequency) per unit time is relatively small (e.g., within a low engine speed operating range). That is, in the reduced-cylinder operation or at a low engine speed, etc., since the combustion frequency per unit time becomes low, the response of the torque reduction tends to degrade if the vehicle attitude control is performed.

SUMMARY OF THE DISCLOSURE

The present disclosure is made in view of solving the issues of the conventional arts described above, and aims to provide a vehicle control device, which suitably prevents a response of a torque reduction by a vehicle attitude control from degrading, by preventing a combustion frequency per unit time from falling below a given value during the vehicle attitude control.

According to one aspect of the present disclosure, a vehicle control device is provided, which includes an engine, an engine control mechanism configured to control torque generated by the engine, and a processor configured to execute a vehicle attitude controlling module to perform a vehicle attitude control in which the engine control mechanism is controlled to reduce the torque so as to decelerate the vehicle, when a condition that the vehicle is traveling and a steering angle related value that is related to a steering angle of a steering device increases is satisfied, and a preventing module to prevent a combustion frequency of the engine per unit time from falling below a given value while the vehicle attitude controlling module executes the vehicle attitude control.

With the above configuration, while the vehicle attitude control in which the engine torque is reduced according to the steering angle related value so as to decelerate the vehicle is performed, the combustion frequency of the engine per unit time is prevented from falling below the given value. Thus, it is prevented that a response of the torque reduction by the vehicle attitude control is degraded due to the combustion frequency of the engine being lower during the vehicle attitude control. That is, the torque reduction by the vehicle attitude control is suitably secured. Therefore, with the configuration, it is suitably prevented that a desired vehicle behavior in turning is not achieved and a driver feels a sense of discomfort due to the combustion frequency being lower during the vehicle attitude control.

The engine may include a plurality of cylinders and be switchable of an operation mode between a reduced-cylinder operation in which combustion in one or some of the plurality of cylinders is suspended and an all-cylinder operation in which combustion is performed in all of the plurality of cylinders. The preventing module may set the given value to be higher when the engine performs the reduced-cylinder operation than when the engine performs the all-cylinder operation.

With the above configuration, even when the reduced-cylinder operation is performed during the vehicle attitude control, the reduction of the combustion frequency of the engine is effectively prevented and the response degradation of the torque reduction by the vehicle attitude control is prevented.

The vehicle control device may further include an engine speed detector configured to detect a speed of the engine. The preventing module may prevent the combustion frequency from falling below the given value by preventing the detected engine speed from falling below a given speed.

With the above configuration, it is suitably prevented that the desired vehicle behavior in turning is not achieved and the driver feels a sense of discomfort due to the engine speed reduction during the vehicle attitude control.

The engine may include a plurality of cylinders and have an operation mode of a reduced-cylinder operation in which combustion in one or some of the plurality of cylinders is suspended. The preventing module may prevent the combustion frequency from falling below the given value by preventing the reduced-cylinder operation of the engine.

With the above configuration, it is suitably prevented that the desired vehicle behavior in turning is not achieved and the driver feels a sense of discomfort due to performing the reduced-cylinder operation during the vehicle attitude control.

The preventing module may prohibit the combustion frequency from falling below the given value or prevent the engine from entering into an operating state where the combustion frequency falls below the given value.

The vehicle control device may further include an automatic transmission provided on a driving force transmission path extending between the engine and steerable wheels of the vehicle. The preventing module may prevent the combustion frequency from falling below the given value by preventing the automatic transmission from upshifting.

With the above configuration, it is suitably prevented that the desired vehicle behavior in turning is not achieved and the driver feels a sense of discomfort due to upshifting of the automatic transmission during the vehicle attitude control.

The vehicle control device may further include a steering angle sensor configured to detect the steering angle of the steering device. The vehicle attitude controlling module may determine that the steering angle related value increases when a change rate of the detected steering angle is higher than a given rate.

According to another aspect of the present disclosure, a vehicle control device is provided, which includes an engine, an engine control mechanism configured to control torque generated by the engine, and a processor configured to execute a vehicle attitude controlling module to perform a vehicle attitude control in which the engine control mechanism is controlled to reduce the torque so as to decelerate the vehicle, when a condition that the vehicle is traveling and a steering angle related value that is related to a steering angle of a steering device increases is satisfied, and a preventing module to prevent an engine speed from falling below a given speed while the vehicle attitude controlling module executes the vehicle attitude control.

With the above configuration, it is suitably prevented that the desired vehicle behavior in turning is not achieved and the driver feels a sense of discomfort due to the engine speed reduction during the vehicle attitude control.

According to another aspect of the present disclosure, a vehicle control device is provided, which includes an engine including a plurality of cylinders and having an operation mode of a reduced-cylinder operation in which combustion in one or some of the plurality of cylinders is suspended, an engine control mechanism configured to control torque generated by the engine, and a processor configured to execute a vehicle attitude controlling module to perform a vehicle attitude control in which the engine control mechanism is controlled to reduce the torque so as to decelerate the vehicle, when a condition that the vehicle is traveling and a steering angle related value that is related to a steering angle of a steering device increases is satisfied, and a preventing module to prevent that the engine performs the reduced-cylinder operation while the vehicle attitude controlling module executes the vehicle attitude control.

With the above configuration, it is suitably prevented that the desired vehicle behavior in turning is not achieved and the driver feels a sense of discomfort due to performing the reduced-cylinder operation during the vehicle attitude control.

DETAILED DESCRIPTION OF THE DISCLOSURE

Figure 1:
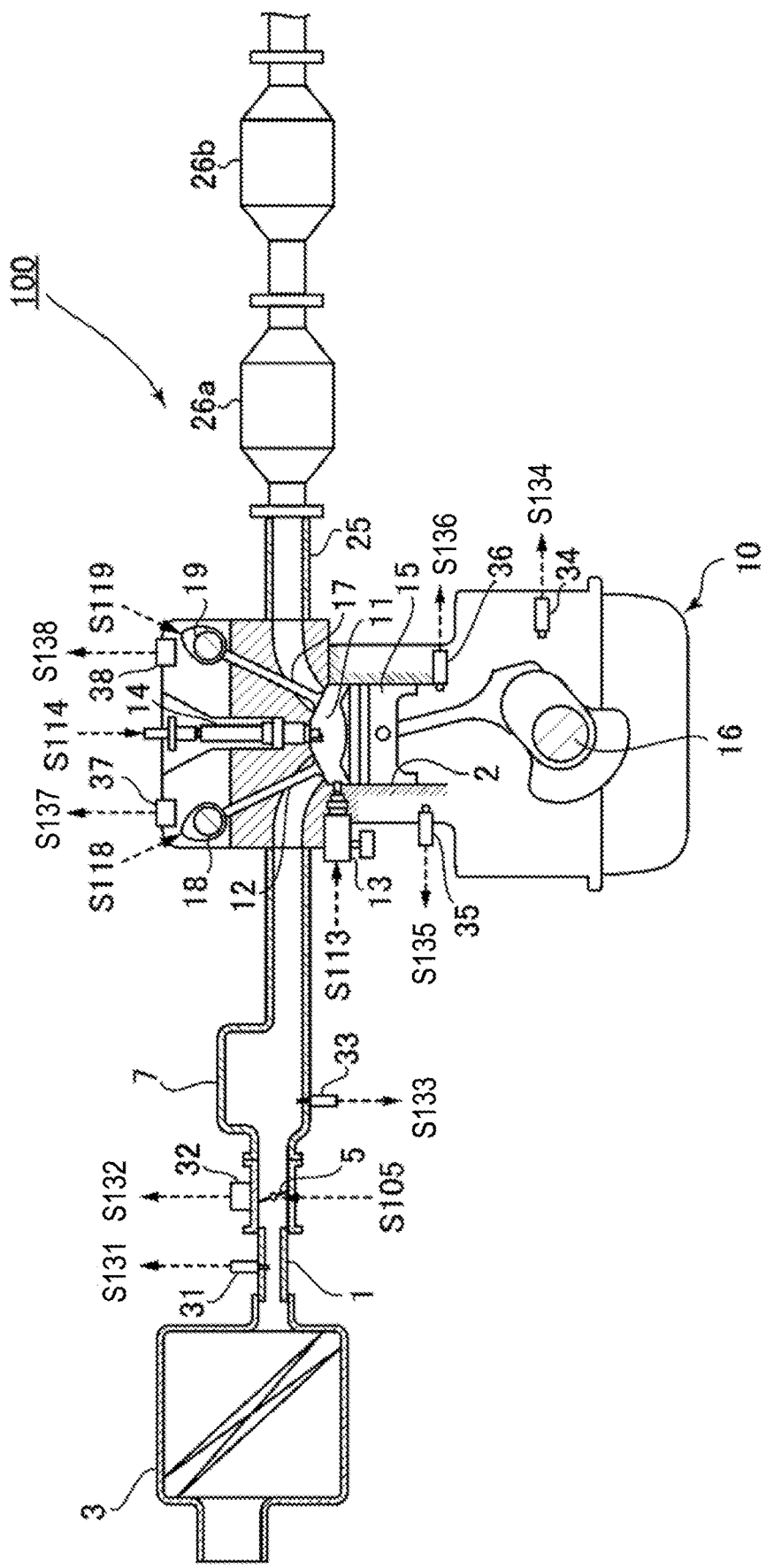
FIG. 1 is a schematic configuration view of an engine system to which a vehicle control device according to one embodiment of the present disclosure is applied.
Figure 2:
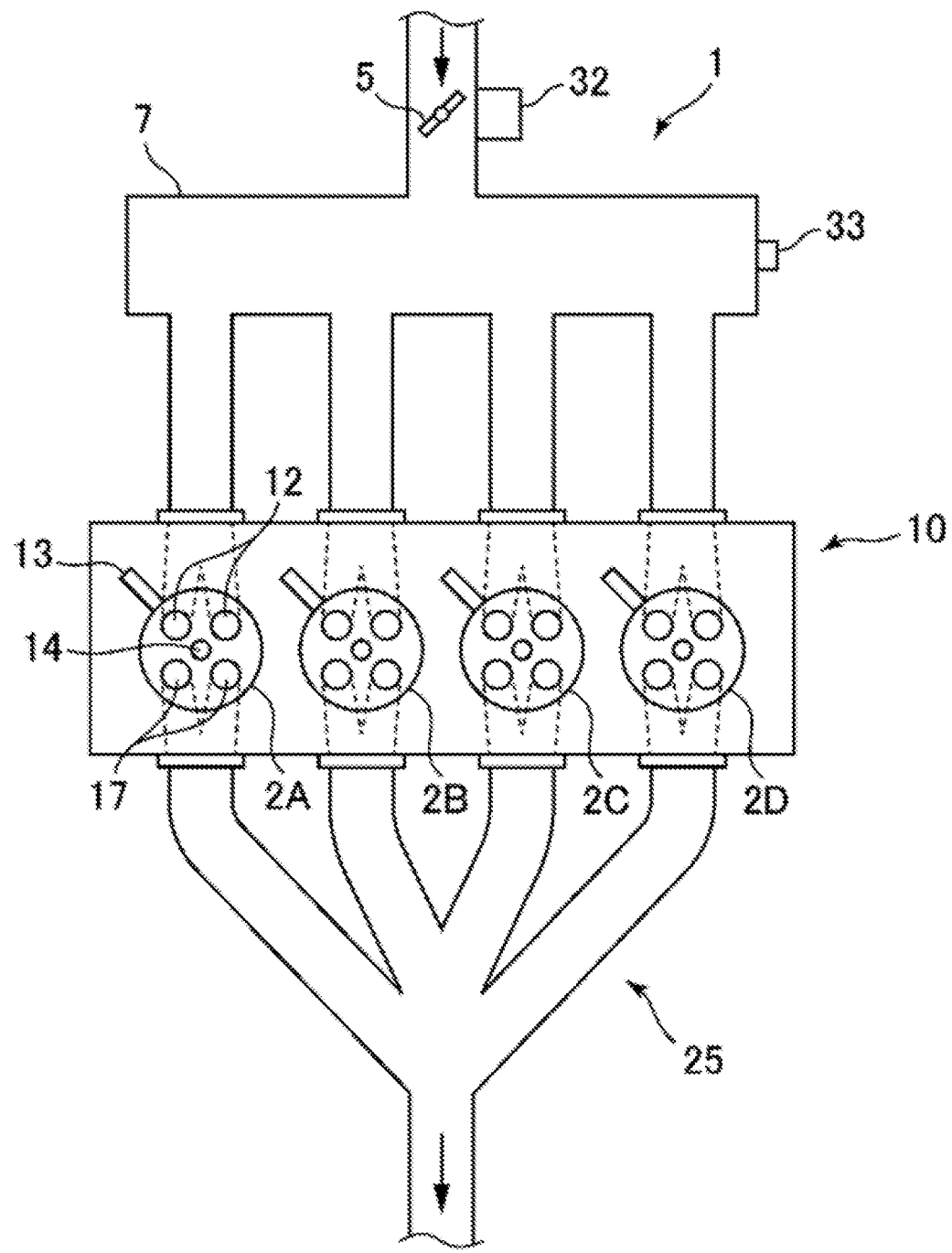
FIG. 2 is a schematic plan view of an engine according to the embodiment of the present disclosure.
Figure 3:
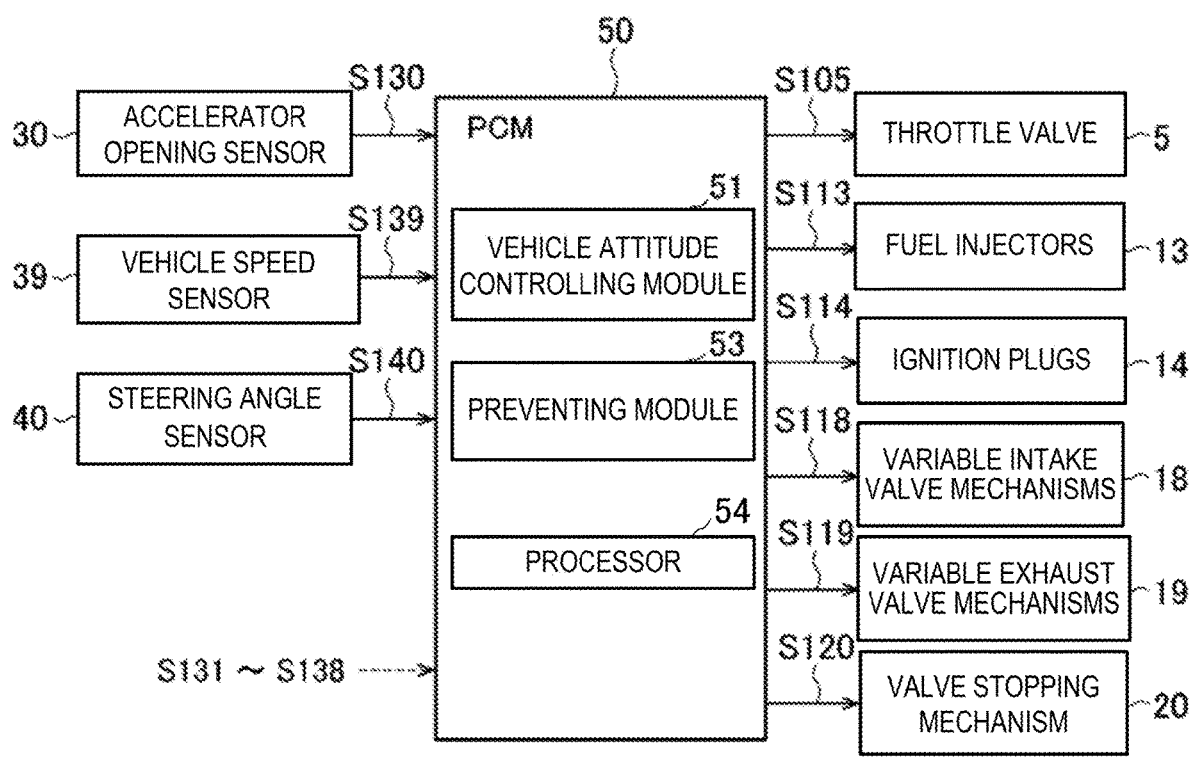
FIG. 3 is a block diagram illustrating an electric configuration of the vehicle control device according to the embodiment of the present disclosure.

Hereinafter, a vehicle control device according to one embodiment of the present disclosure is described with reference to the accompanying drawings.
<System Configuration>
First, an engine system to which the vehicle control device according to this embodiment is applied is described with reference to FIGS. 1 to 3. FIG. 1 is a schematic configuration view of the engine system to which the vehicle control device is applied according to the embodiment of the present disclosure. FIG. 2 is a schematic plan view of an engine according to the embodiment of the present disclosure. FIG. 3 is a block diagram illustrating an electric configuration of the vehicle control device according to the embodiment of the present disclosure.

As illustrated in FIGS. 1 and 3, an engine system 100 mainly has an intake passage 1 through which intake air (air) externally introduced passes, an engine 10 (particularly, a gasoline engine) configured to generate a driving force for a vehicle on which the engine 10 is mounted by combusting a mixture gas of the intake air supplied from the intake passage 1 and fuel supplied from a fuel injector 13 (described later), an exhaust passage 25 through which exhaust gas generated by the combustion inside the engine 10 is discharged, sensors 30 to 40 configured to detect various kinds of states regarding the engine system 100, and a PCM (Power-train Control Module) 50 configured to control the entire engine system 100.

In the intake passage 1, an air cleaner 3 configured to purify the externally introduced intake air, a throttle valve 5 configured to adjust an amount of intake air passing therethrough (intake air amount), and a surge tank 7 configured to temporarily store intake air to be supplied to the engine 10 are arranged in this order from upstream side.

As illustrated in FIG. 2, the engine 10 of this embodiment is an inline four-cylinder engine including four cylinders 2 (2A to 2D) arranged in line. This engine 10 also has an intake valve 12 (two intake valves for each cylinder in this embodiment) configured to introduce the intake air supplied from the intake passage 1 into a combustion chamber 11, the fuel injector 13 configured to inject the fuel into the combustion chamber 11, an ignition plug 14 configured to ignite the mixture gas of the intake air and the fuel supplied into the combustion chamber 11, a piston 15 configured to reciprocate by combustion of the mixture gas inside the combustion chamber 11, a crankshaft 16 configured to rotate by the reciprocation motion of the piston 15, and an exhaust valve 17 (two exhaust valves for each cylinder in this embodiment) configured to discharge the exhaust gas generated by the combustion of the mixture gas inside the combustion chamber 11 to the exhaust passage 25.

The piston 15 is provided in each of the cylinders 2A to 2D and they reciprocate with a phase difference of 180° in crank angle (180° CA) from each other. Accordingly, ignition timings of the respective cylinders 2A to 2D vary 180° CA from each other.

The engine 10 of this embodiment is a cylinder deactivation engine where an operation in which two of the four cylinders 2A to 2D are suspended while the remaining two cylinders operate, that is, a reduced-cylinder operation is performable.

For example, when the cylinder 2A is the first cylinder, the cylinder 2B is the second cylinder, the cylinder 2C is the third cylinder, and the cylinder 2D is the fourth cylinder in this order from the left side in FIG. 2, during an all-cylinder operation in which all of the four cylinders 2A to 2D are operated (in an all-cylinder operation mode), the ignition is performed in the order of the first cylinder 2A, the third cylinder 2C, the fourth cylinder 2D, and the second cylinder 2B.

Further, during the reduced-cylinder operation (in a reduced-cylinder operation mode), the ignition operation of the ignition plug 14 is prohibited for two of the cylinders of which the order of ignition is not successive (the first cylinder 2A and the fourth cylinder 2D in this embodiment), and the ignition is alternately performed in the remaining two cylinders (that is, the third cylinder 2C and the second cylinder 2B).

Moreover, the engine 10 is variable of operation timings of the intake valve 12 and the exhaust valve 17 (corresponding to valve phases) by a variable intake valve mechanism 18 and a variable exhaust valve mechanism 19 which are variable valve timing mechanisms, respectively. The variable intake valve mechanism 18 and the variable exhaust valve mechanism 19 may adopt various types of known mechanisms. For example, the operation timings of the intake and exhaust valves 12 and 17 may be varied using electromagnetic or hydraulic mechanisms.

The engine 10 also has a valve stopping mechanism 20 configured to stop opening and closing operations of the intake valves 12 and the exhaust valves 17 of the first cylinder 2A and the fourth cylinder 2D during the reduced-cylinder operation. The valve stopping mechanism 20 includes, for example, a so-called lost motion mechanism which intervenes between a cam and the valve and enables or disables a transmission of a driving force of the cam to the valve. Alternatively, the valve stopping mechanism 20 may include two kinds of cams having different cam profiles, i.e., a first cam having a cam nose that performs an opening and closing operation of the valve and a second cam that stops the opening and closing operation, and a so-called cam shifting mechanism configured to selectively transmit an operation state of one of the first and second cams.

In the exhaust passage 25, exhaust purification catalysts 26a and 26b having an exhaust gas purifying function (such as a $NO_x$ catalyst, a three-way catalyst, or an oxidation catalyst) are mainly provided. Hereinafter, when referring to the exhaust purification catalysts 26a and 26b without distinguishing one from the other, they are simply referred to as "the exhaust purification catalyst 26."

Further, the engine system 100 is provided with the sensors 30 to 40 configured to detect the various kinds of states regarding the engine system 100. That is, the accelerator opening sensor 30 detects an accelerator opening that is an opening of an accelerator pedal (corresponding to a depression amount of the accelerator pedal by a vehicle driver). The airflow sensor 31 detects an intake air amount corresponding to a flow rate of the intake air that passes through the intake passage 1. The throttle opening sensor 32 detects a throttle opening that is an opening of the throttle valve 5. The pressure sensor 33 detects pressure inside an intake manifold corresponding to intake air pressure that is applied to the engine 10. The crank angle sensor 34 detects a crank angle of the crankshaft 16. The water temperature sensor 35 detects a temperature of a coolant that cools the engine 10 (water temperature). The temperature sensor 36 detects a temperature inside the cylinder 2 of the engine (in-cylinder temperature). The cam angle sensors 37 and 38 detect operation timings, including close timings, of the intake valve 12 and the exhaust valve 17, respectively. The vehicle speed sensor 39 detects a speed of the vehicle (vehicle speed). The steering angle sensor 40 detects a rotational angle of a steering wheel (steering angle). The steering wheel may be one example of the "steering device." Note that an engine speed is determined based on any of the values detected by the above sensors, and the sensor(s) of which a detection value is used for determining the engine speed may be referred to as the "engine speed detector." These various sensors 30 to 40 output to the PCM 50 detection signals S130 to S140 corresponding to the detected parameters.

The PCM 50 controls various components of the engine system 100 based on the detection signals S130 to S140 received from the various sensors 30 to 40 described above. For example, as illustrated in FIG. 3, the PCM 50 supplies a control signal S105 to the throttle valve 5 to control the open and close timings and opening of the throttle valve 5, supplies a control signal S113 to the fuel injector 13 to control a fuel injection amount and a fuel injection timing, supplies a control signal S114 to the ignition plug 14 to control the ignition timing, supplies control signals S118 and S119 to the variable intake valve mechanism 18 and the variable exhaust valve mechanism 19 to control the operation timings of the intake valve 12 and the exhaust valve 17, respectively, and supplies a control signal S120 to the valve stopping mechanism 20 to control the open and close operations of the intake and exhaust valves 12 and 17 of the first and fourth cylinders 2A and 2D. Note that the throttle valve 5, the fuel injector 13, the ignition plug 14, the variable intake valve mechanism 18, and the variable exhaust valve mechanism 19 may be examples of the "engine control mechanism."

In this embodiment, the PCM 50 has the following functional components. That is, the PCM 50 includes a vehicle attitude controlling module 51 configured to perform a vehicle attitude control in which the attitude of the vehicle is controlled by reducing a torque of the engine 10 to decelerate the vehicle when a condition that the vehicle is traveling and a steering angle related value which is related to a steering angle of the steering wheel (typically, a steering rate) increases (vehicle attitude control starting/executing condition) is satisfied. When a given condition for terminating the vehicle attitude control (vehicle attitude control terminating condition) is satisfied, the vehicle attitude controlling module 51 controls the engine 10 to bring the torque back to that before the vehicle attitude control. Note that the vehicle attitude control may suitably be referred to as a "torque reduction control."

Further, the PCM 50 has a preventing module 53 configured to prevent a combustion frequency of the engine 10 per unit time from falling below a given value while the vehicle attitude controlling module 51 executes the vehicle attitude control. In this embodiment, the preventing module 53 prevents the combustion frequency of the engine 10 per unit time from falling below the given value by preventing the engine 10 from performing the reduced-cylinder operation during the vehicle attitude control (typically, prohibiting the reduced-cylinder operation).

The respective components of the PCM 50 are configured by a computer including a processor 54 (e.g. a CPU (central processing unit)) and internal memory, such as ROM(s) and RAM(s) configured to store various programs which are interpreted and executed on the processor 54 (the programs include a basic control program (e.g., an OS) and an application program activated on the OS and configured to achieve a particular function), and various data. The processor 54 is configured to execute the vehicle attitude controlling module 51 and the preventing module 53 to perform their respective functions. These modules are stored in the internal memory as one or more software programs.

Figure 4:
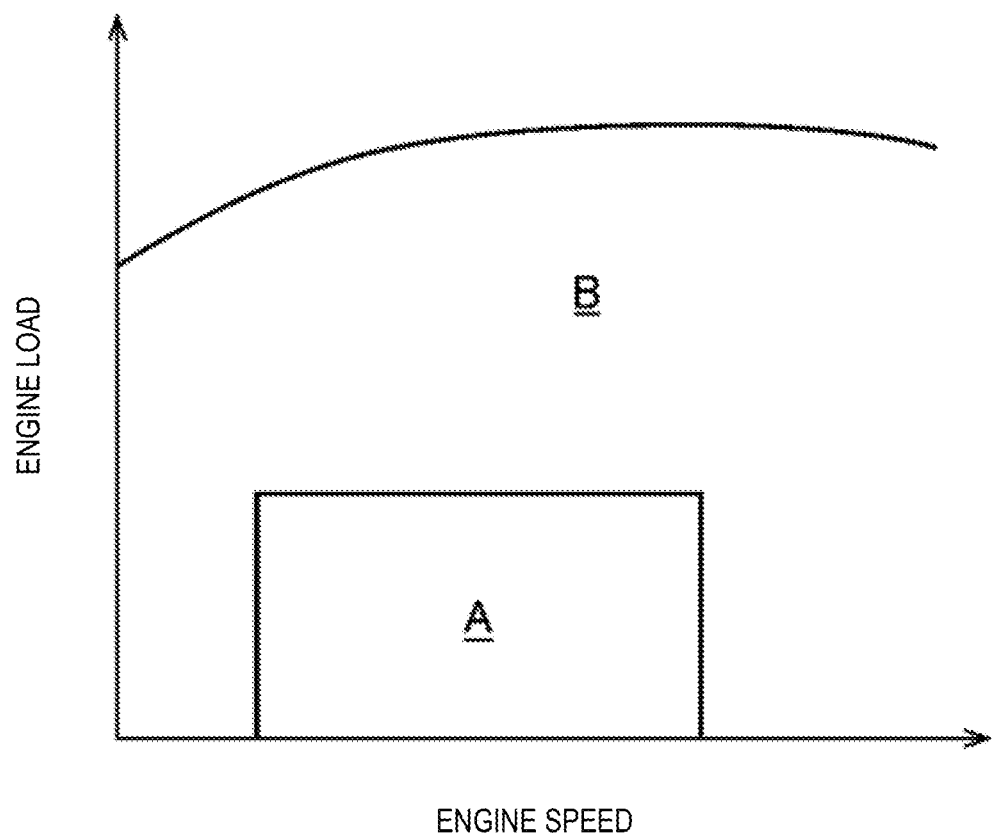
FIG. 4 is a map conceptually illustrating an operating range of the engine where an operation mode is switched according to the embodiment of the present disclosure.

Here, operating ranges of the engine where the reduced-cylinder operation and the all-cylinder operation are performed respectively in this embodiment are described with reference to FIG. 4. FIG. 4 is a map conceptually illustrating an operating range of the engine where the operation mode of the engine is switched (between the reduced-cylinder operation and the all-cylinder operation) according to the embodiment of the present disclosure, in which the horizontal axis indicates the engine speed and the vertical axis indicates an engine load.

As illustrated in FIG. 4, a reduced-cylinder operation range A where the reduced-cylinder operation is performed is set within a range where the engine speed and the engine load are relatively low, and an all-cylinder operation range B where the all-cylinder operation is performed is set outside the reduced-cylinder operation range. With reference to such a map, the PCM 50 determines which of the reduced-cylinder operation range A and the all-cylinder operation range B an engine speed and an engine load concerned correspond to. Based on the determination result, the PCM 50 controls the open and close operations of the intake and exhaust valves 12 and 17 of the first and fourth cylinders 2A and 2D so as to perform one of the reduced-cylinder operation and the all-cylinder operation.

<Contents of Control in this Embodiment>

Next, a control performed by the vehicle control device of this embodiment of the present disclosure is described with reference to FIGS. 5 to 7.

Figure 5:
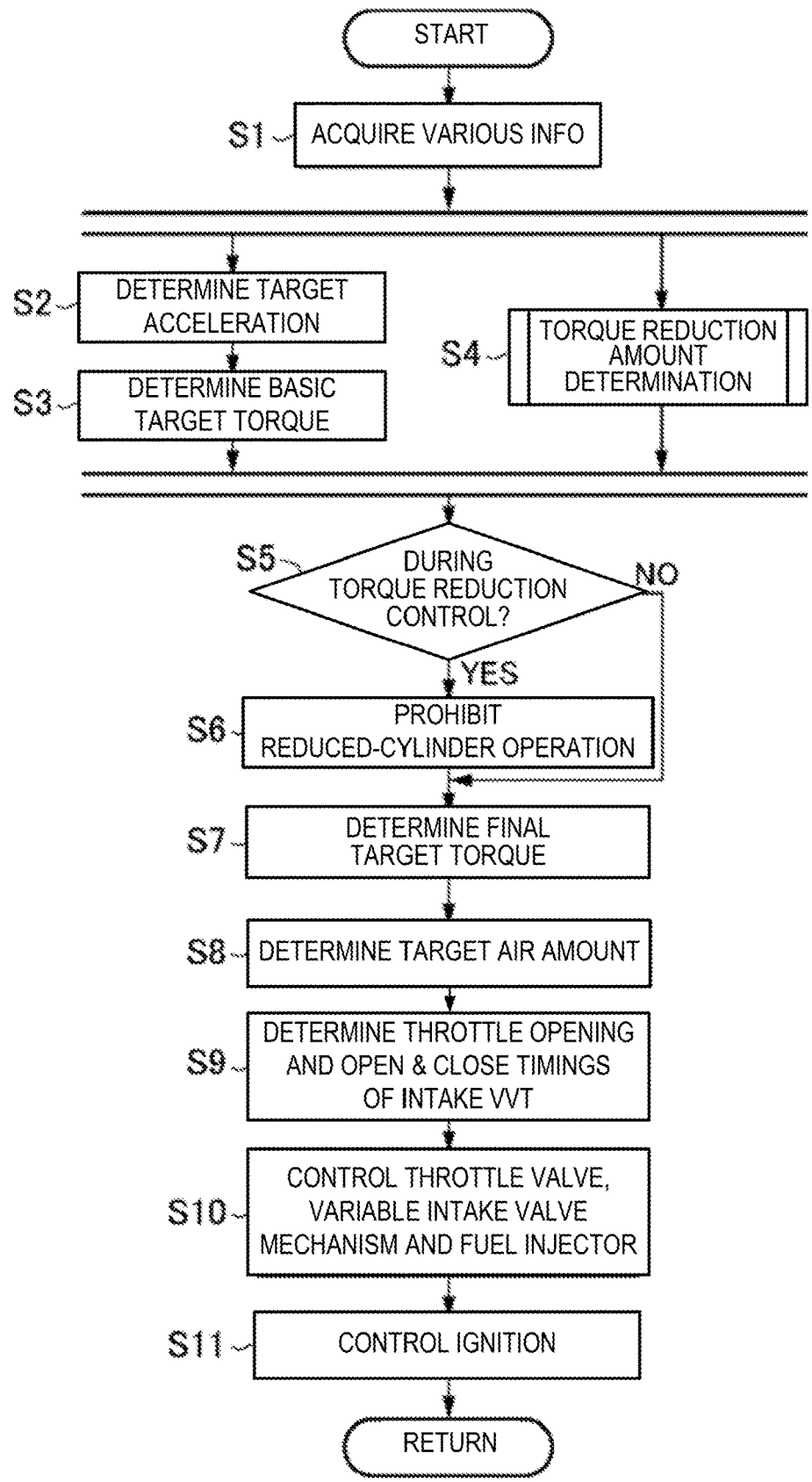
FIG. 5 is a flowchart illustrating an engine control according to the embodiment of the present disclosure.

FIG. 5 is a flowchart illustrating an engine control according to the embodiment of the present disclosure. FIG. 6 is a flowchart illustrating a torque reduction amount determination according to the embodiment of the present disclosure. FIG. 7 is a map illustrating a relationship between a target additional deceleration and the steering rate according to the embodiment of the present disclosure.

The engine control of FIG. 5 is activated when an ignition switch of the vehicle is turned ON, and power is supplied to a control device of the engine. The engine control is repeatedly performed, basically while the vehicle is traveling.

When the engine control is started, as illustrated in FIG. 5, the PCM 50 acquires an operating state of the vehicle at S1. For example, the PCM 50 acquires, as the operating state, the detection signals S130 to S140 outputted from the various sensors 30 to 40, including the accelerator opening detected by the accelerator opening sensor 30, the vehicle speed detected by the vehicle speed sensor 39, the steering angle detected by the steering angle sensor 40, and a gear position currently set in an automatic transmission of the vehicle which is provided on a driving force transmission path extending between the engine and steerable wheels. Further, the PCM 50 determines, based on the engine speed and the engine load, whether the engine 10 is in the reduced-cylinder operation or the all-cylinder operation. Note that the PCM 50 also acquires this operation mode as the operating state. Here, the PCM 50 determines the operation mode with reference to the map of FIG. 4.

Next, at S2, the PCM 50 sets a target acceleration based on the operating state of the vehicle including the accelerator pedal operation acquired at S1. For example, the PCM 50 selects an acceleration characteristic map corresponding to a current vehicle speed and gear position, from acceleration characteristic maps defined for various vehicle speeds and gear positions (they are created in advance and stored in memory, etc.). The PCM 50 determines the target acceleration corresponding to a current accelerator opening by referring to the selected acceleration characteristic map.

Next, at S3, the PCM 50 determines a basic target torque of the engine 10 for achieving the target acceleration determined at S2. Here, the PCM 50 determines the basic target torque within a torque range which is outputtable by the engine 10, based on the vehicle speed, the gear position, a road surface slope, a road surface μ, etc. at this time point.

In parallel to the processes at S2 and S3, the PCM 50 performs the torque reduction amount determination at S4 for determining the torque reduction amount of the torque reduction control (vehicle attitude control) based on the steering angle detected by the steering angle sensor 40. This torque reduction amount determination is described later in detail.

Next, at S5, the PCM 50 determines whether the torque reduction control (vehicle attitude control) is currently being performed. In other words, whether the vehicle attitude controlling module 51 of the PCM 50 is currently executing the torque reduction control is determined. If the torque reduction control is currently performed (S5: YES), the PCM 50 proceeds to S6 where the execution of the reduced-cylinder operation by the engine 10 is prohibited. In other words, the PCM 50 prohibits the operation mode of the engine 10 from switching from the all-cylinder operation to the reduced-cylinder operation, and then proceeds to S7. In this manner, degradation of a response of the torque reduction by the torque reduction control caused by executing the torque reduction control during the reduced-cylinder operation is prevented. On the other hand, if the torque reduction control is not currently performed (S5: NO), the PCM 50 proceeds to S7 without performing the processing at S6. In this case, since the torque reduction control is performed in the first place, the degradation does not occur, therefore the PCM 50 allows the execution of the reduced-cylinder operation.

Next, at S7, the PCM 50 determines a final target torque based on the basic target torque determined at S3 and the torque reduction amount determined in the torque reduction amount determination at S4. For example, the PCM 50, upon determining the torque reduction amount in the torque reduction amount determination (i.e., the torque reduction control is performed), determines the final target torque by subtracting the torque reduction amount from the basic target torque. On the other hand, when the torque reduction amount is not determined in the torque reduction amount determination (i.e., the torque reduction control is not performed), the PCM 50 determines the basic target torque to be the final target torque as it is.

Next, at S8, the PCM 50 determines a target air amount and a target fuel amount for causing the engine 10 to output the final target torque determined at S7. Here, "air amount" means an amount of air introduced into the combustion chamber 11 of the engine 10. Alternatively, it may be a charging efficiency which is obtained by nondimensionalizing the air amount. For example, the PCM 50 calculates a target indicated torque obtained by adding to the final target torque a loss torque caused by a friction loss and a pumping loss, calculates the target fuel amount required for generating the target indicated torque, and based on the target fuel amount and a target equivalent ratio, determines the target air amount.

Next, at S9, in order to introduce to the engine 10 the air by the target air amount determined at S8, the PCM 50 determines the opening of the throttle valve 5 and the timings of the intake valve 12 to be opened and closed via the variable intake valve mechanism 18, in consideration of the air amount detected by the airflow sensor 31.

Next, at S10, the PCM 50 controls the throttle valve 5 and the variable intake valve mechanism 18 based on the throttle opening and the open and close timings of the intake valve 12 determined at S9, and also controls the fuel injector 13 based on the target fuel amount calculated at S8.

Next, at S11, based on the final target torque determined at S7 and an actual amount of air introduced into the combustion chamber 11 by the control of the throttle valve 5 and the variable intake valve mechanism 18 at S9, the PCM 50 sets an ignition timing so that the final target torque is outputted from the engine 10, and controls the ignition plug 14 to perform the ignition at the set ignition timing. After S11, the PCM 50 terminates the engine control.

Figure 6:
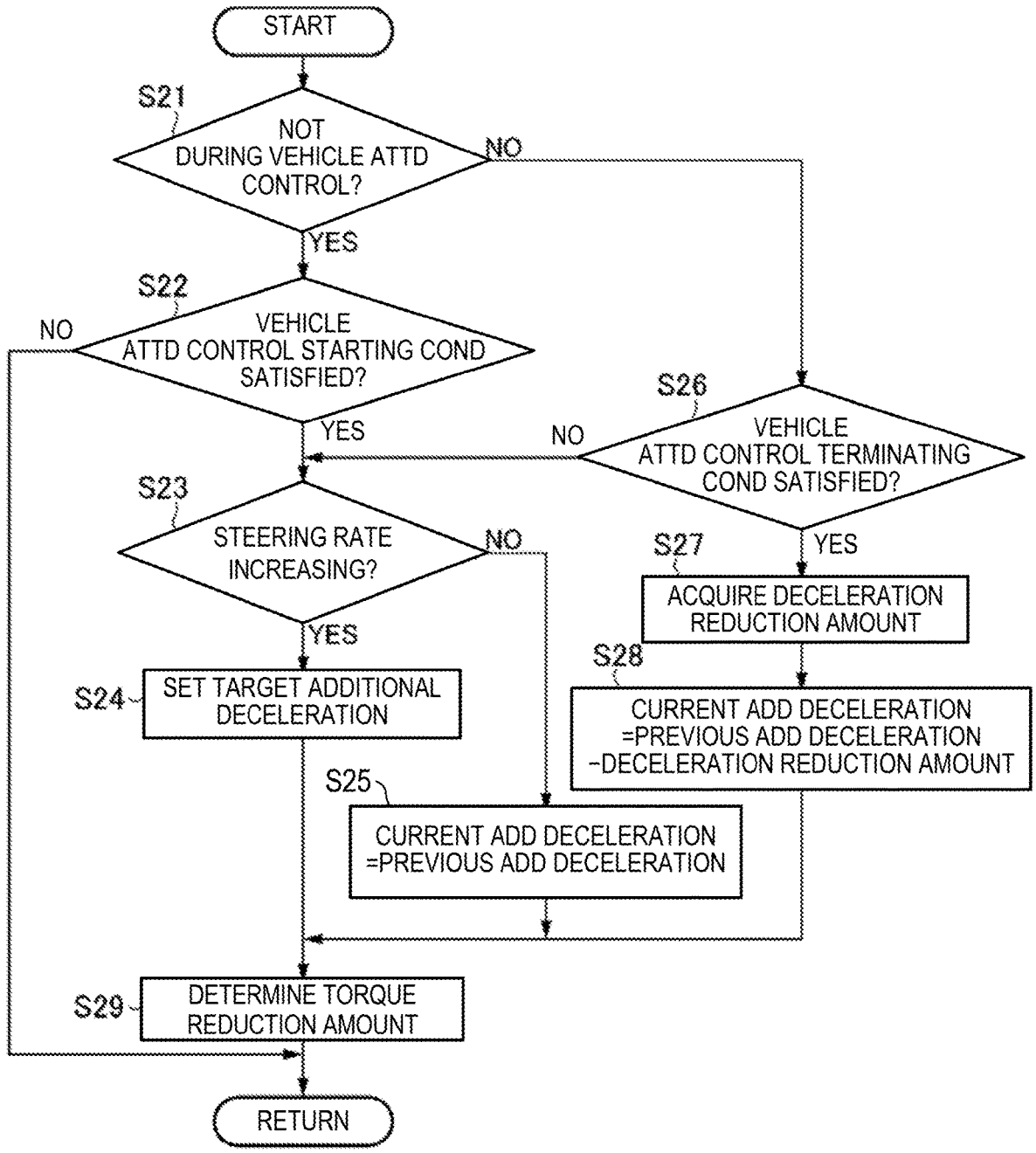
FIG. 6 is a flowchart illustrating a torque reduction amount determination according to the embodiment of the present disclosure.

Next, the torque reduction amount determination illustrated in FIG. 6 is described. This torque reduction amount determination is performed at S4 of FIG. 5.

When the torque reduction amount determination is started, at S21, the PCM 50 determines whether the vehicle attitude control is currently being performed. If the vehicle attitude control is not performed (S21: YES), the process proceeds to S22 where the PCM 50 determines whether a vehicle attitude control starting condition is satisfied. For example, the PCM 50 determines whether a change rate of the steering angle (which may be calculated based on the steering angle acquired at S1) is above a given start threshold. If the change rate of the steering angle is above the start threshold, that is, if the vehicle attitude control starting condition is satisfied (S22: YES), the process proceeds to S23. On the other hand, if the change rate of the steering angle is below the start threshold, that is, if the vehicle attitude control starting condition is not satisfied (S22: NO), the process is terminated.

Next, at S23, the PCM 50 determines whether the steering rate (the change rate of the steering angle) is increasing. As a result, if the steering rate is increasing (S23: YES), the process proceeds to S24 where the PCM 50 sets the target additional deceleration based on the steering rate. This target additional deceleration is a deceleration to be added to the vehicle according to the steering operation so that the vehicle behavior intended by the driver is accurately achieved.

Figure 7:
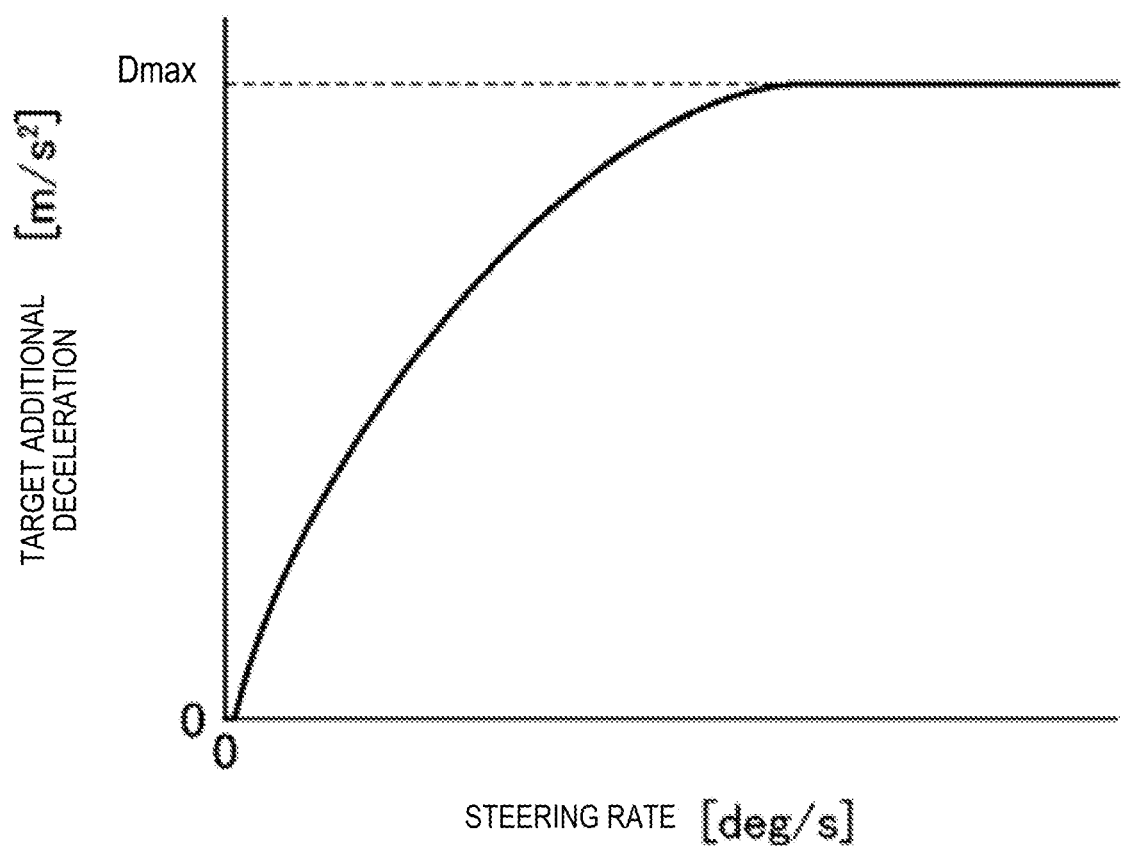
FIG. 7 is a map illustrating a relationship between a target additional deceleration and a steering rate according to the embodiment of the present disclosure.

Basically, the PCM 50 acquires the target additional deceleration corresponding to the current steering rate based on a relationship between the target additional deceleration and the steering rate illustrated in the map of FIG. 7. In FIG. 7, the horizontal axis indicates the steering rate and the vertical axis indicates the target additional deceleration. As illustrated in FIG. 7, as the steering rate increases, the target additional deceleration corresponding to the steering rate gradually approaches to a given upper limit value (e.g., 1 m/s$^2$). For example, as the steering rate increases, the target additional deceleration increases while the rate of the increase amount becomes lower.

On the other hand, as a result of the determination at S23, if the steering rate is not increasing (S23: NO), that is, the steering rate is decreasing or constant, the process proceeds to S25 where the PCM 50 determines the additional deceleration determined in the previous processing as the additional deceleration in the current processing.

Moreover, as a result of the determination at S21, if the vehicle attitude control is already in execution (S21: NO), the process proceeds to S26 where the PCM 50 determines whether the vehicle attitude control terminating condition is satisfied. For example, the PCM 50 determines whether the change rate of the steering angle is below a given termination threshold. If the change rate of the steering angle is above the termination threshold, that is, if the vehicle attitude control terminating condition is not satisfied (S26: NO), the process proceeds to S23. In this case, the PCM 50 performs the processing of S23 and thereafter, in order to continue the vehicle attitude control.

On the other hand, if the change rate of the steering angle is below the termination threshold, that is, if the vehicle attitude control terminating condition is satisfied (S26: YES), the process proceeds to S27 where the PCM 50 acquires an amount of reducing in the current processing the additional deceleration determined in the previous processing (deceleration reduction amount). In one example, similar to the target additional deceleration, the PCM 50 calculates the deceleration reduction amount based on the reduction rate corresponding to the steering rate, by using the map as illustrated in FIG. 7. In another example, the PCM 50 calculates the deceleration reduction amount based on a constant reduction rate (e.g., 0.3 m/s$^3$) stored in advance in the memory, etc.

Next, at S28, the PCM 50 determines the additional deceleration in the current processing by subtracting the deceleration reduction amount acquired at S27 from the additional deceleration determined in the previous processing.

After S24, S25, or S28, at S29, the PCM 50 determines the torque reduction amount based on the current additional deceleration determined at S24, S25, or S28. For example, the PCM 50 determines the torque reduction amount required for achieving the current additional deceleration, based on the current vehicle speed, gear position, road surface slope, etc. acquired at S1. After S29, the PCM 50 terminates the torque reduction amount determination and returns to the main routine.

Note that when determining the target additional deceleration at S24 of FIG. 6, the additional deceleration for the current processing may be determined within a range in which an increase rate of the additional deceleration is lower than a given threshold (e.g., 0.5 m/s$^3$). For example, when the increase rate from the additional deceleration determined in the previous processing to the target additional deceleration determined at S24 of the current processing is lower than the threshold, the PCM 50 determines the target additional deceleration determined at S24 to be the additional deceleration for the current processing. On the other hand, when the increase rate from the additional deceleration determined in the previous processing to the target additional deceleration determined at S24 of the current processing is higher than the threshold, the PCM 50 determines a value obtained by increasing the additional deceleration determined in the previous processing by the threshold of the current processing, to be the additional deceleration for the current processing.

<Operations and Effects>

Figure 8:
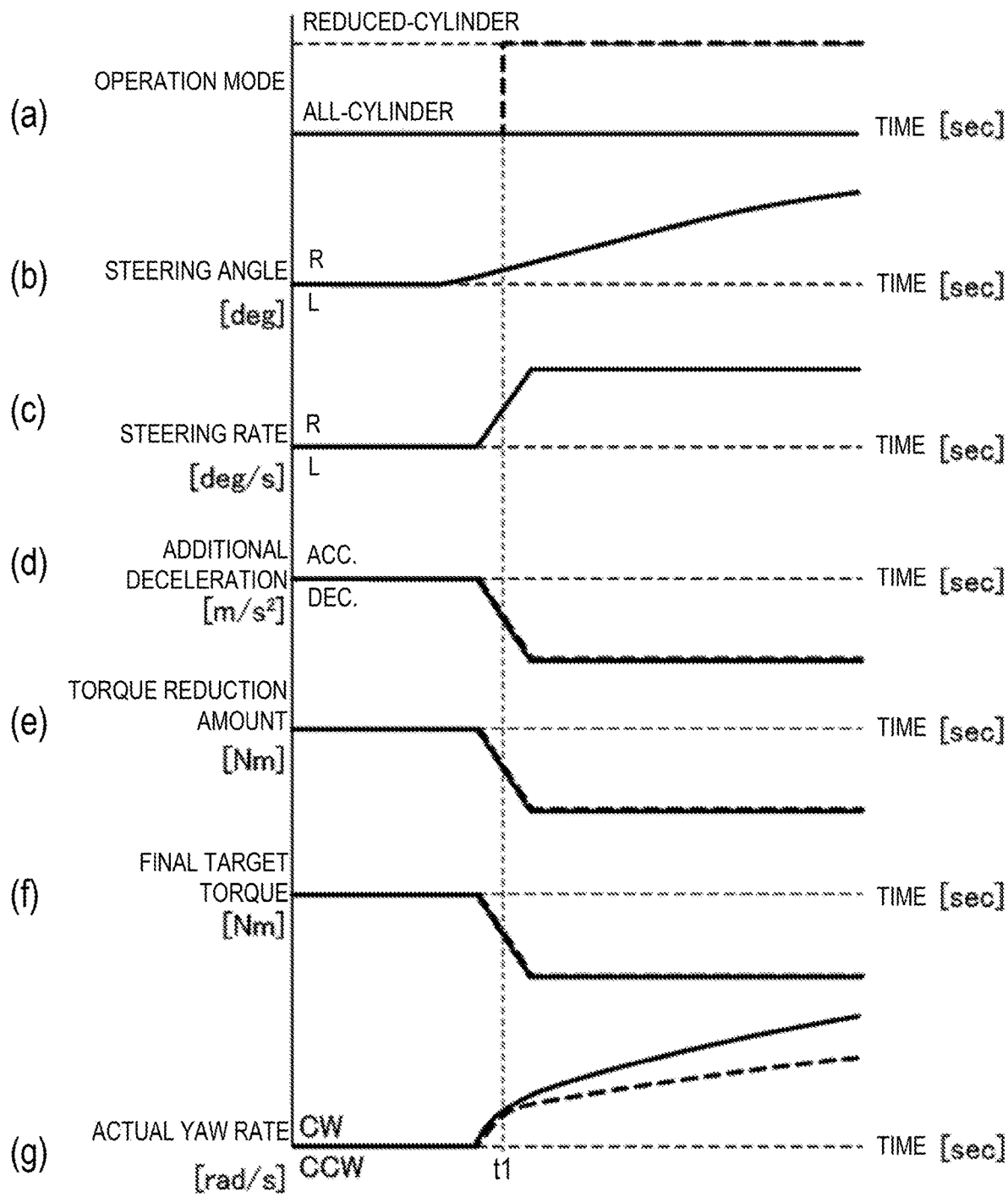
FIG. 8 is a time chart illustrating operations and effects of the vehicle control device according to the embodiment of the present disclosure.

Next, the operations and effects of the vehicle control device according to this embodiment of the present disclosure are described with reference to FIG. 8. FIG. 8 is a time chart illustrating a change of parameters related to the engine control over time in a case where the vehicle equipped with the vehicle control device of this embodiment makes a turn by a steering wheel operation. Here, a situation where the vehicle makes a right turn is illustrated.

Part (a) of FIG. 8 is a line chart illustrating a change in the operation mode of the engine 10, in which the horizontal axis indicates time and the vertical axis indicates the operation mode of the engine 10 (the reduced-cylinder operation mode or the all-cylinder operation mode). Further in Part (a), the solid line indicates the operation mode applied in this embodiment, and the dashed line indicates the operation mode applied in a comparative example.

As illustrated in Part (a) of FIG. 8, a case is described where at a timing t1 which is during the all-cylinder operation of the engine 10, a request for switching the operation mode of the engine 10 from the all-cylinder operation to the reduced-cylinder operation is issued. For example, the operating state of the engine 10 is shifted from an all-cylinder operating range B to a reduced-cylinder operating range A (see FIG. 4). In this case, in the comparative example, the operation mode is switched from the all-cylinder operation to the reduced-cylinder operation according to the switch request at the timing t1 (see the dashed line of Part (a)). In this regard, in this embodiment, since the vehicle attitude control is already performed at the timing t1 (see Parts (d) to (g) of FIG. 8), the PCM 50 prohibits the reduced-cylinder operation and keeps performing the all-cylinder operation.

Part (b) of FIG. 8 is a line chart illustrating a change in the steering angle of the vehicle making the right turn, in which the horizontal axis indicates time and the vertical axis indicates the steering angle. As illustrated in Part (b), after the rightward steering operation is started, the rightward steering angle gradually increases up to a largest angle as an additional steering-in operation is performed.

Part (c) of FIG. 8 is a line chart illustrating a change in the steering rate of the vehicle making the right turn as illustrated in Part (b), in which the horizontal axis indicates time and the vertical axis indicates the steering rate. The steering rate of the vehicle is expressed by a time differentiation of the steering angle of the vehicle. That is, as illustrated in Part (c), when the rightward steering is started, the rightward steering rate increases from zero and is then kept substantially constant.

Part (d) of FIG. 8 is a line chart illustrating a change in the additional deceleration determined based on the steering rate illustrated in Part (c), in which the horizontal axis indicates time and the vertical axis indicates the additional deceleration. In Part (d), the solid line indicates the additional deceleration applied in this embodiment, and the dashed line indicates the additional deceleration applied in the comparative example (similar for Parts (e) to (g) described later).

As illustrated in Part (d) of FIG. 8, in both this embodiment and the comparative example, when the vehicle attitude control starting condition in which the change rate of the steering angle is above the start threshold is satisfied, the PCM 50 activates the vehicle attitude control (torque reduction control) to start increasing the additional deceleration (absolute value). The PCM 50 keeps the additional deceleration once the steering rate becomes substantially constant. Then, when the vehicle attitude control terminating condition in which the change rate of the steering angle is below the termination threshold is satisfied, the PCM 50 reduces the additional deceleration (absolute value) to terminate the vehicle attitude control (not illustrated).

Part (e) of FIG. 8 is a line chart illustrating a change in the torque reduction amount determined based on the additional deceleration illustrated in Part (d), in which the horizontal axis indicates time and the vertical axis indicates the torque reduction amount. The PCM 50 determines the torque reduction amount required for achieving the additional deceleration based on parameters such as the current vehicle speed, the gear position, the road surface slope, etc. Thus, if these parameters are fixed, the torque reduction amount is determined to change similarly to the change of the additional deceleration illustrated in Part (d) in both this embodiment and the comparative example (see solid and dashed lines of Part (e)).

Part (f) of FIG. 8 is a line chart illustrating a change in the final target torque determined based on the basic target torque and the torque reduction amount, in which the horizontal axis indicates time and the vertical axis indicates torque. The PCM 50 determines the final target torque by subtracting the torque reduction amount determined by the torque reduction amount determination from the basic target torque (here, the basic target torque is substantially fixed). Thus, in this embodiment and the comparative example, the change in the torque reduction amount illustrated in Part (e) is reflected on the final target torque (see the solid and dashed lines of Part (f)).

Part (g) of FIG. 8 illustrates a change of a yaw rate (actual yaw rate) which occurs in the vehicle when the engine 10 is controlled to achieve the final target torque in the case where the vehicle is steered as illustrated in Part (b) of FIG. 8. In Part (g), the horizontal axis indicates time and the vertical axis indicates the yaw rate.

Basically, when the rightward steering operation is started and the torque reduction amount is increased as the rightward steering rate increases (see Part (e) of FIG. 8), loads applied to the front wheels which are steerable wheels of the vehicle increases. As a result, a frictional force between the front wheels and the road surface increases, a cornering force of the front wheels increases, and turnability of the vehicle improves. Thus, as illustrated in Part (g), a relatively large yaw rate in a clockwise direction (CW) is generated in the vehicle.

In this case, according to the comparative example, the operation mode of the engine 10 is switched from the all-cylinder operation to the reduced-cylinder operation at the timing t1 that is during the vehicle attitude control (particularly, during the increase of the torque reduction amount by the vehicle attitude control). During the reduced-cylinder operation, since the combustion time interval of the engine 10 is comparatively long, it is difficult for the engine 10 to suitably achieve the final target torque determined according to the torque reduction amount. That is, during the reduced-cylinder operation, since the time from the issuance of the torque reduction request until reaching the combustion timing of the cylinder 2 the first time is longer than that during the all-cylinder operation, the response of the torque reduction by the vehicle attitude control degrades. Therefore, in the comparative example in which the reduced-cylinder operation is performed during the vehicle attitude control, compared to this embodiment in which the reduced-cylinder operation is prohibited during the vehicle attitude control, a yaw rate which occurs in the vehicle becomes lower after the timing t1, particularly, a change rate of the yaw rate becomes gradual (the solid and dashed lines of Part (g) of FIG. 8). Thus, according to the comparative example, a desired vehicle behavior in turning is not achieved and the driver feels a sense of discomfort.

In this regard, according to this embodiment, since the reduced-cylinder operation is prohibited during the vehicle attitude control so as to keep performing the all-cylinder operation, the torque reduction by the vehicle attitude control is suitably secured. Therefore, according to this embodiment, the degradation of the response of the torque reduction due to performing the reduced-cylinder operation during the vehicle attitude control as in the comparative example is prevented. For example, according to this embodiment, it is suitably prevented that the desired vehicle behavior in turning is not achieved and the driver feels a sense of discomfort due to performing the reduced-cylinder operation during the vehicle attitude control.

<Modifications>

Next, various modifications of the embodiment described above are described.

In the above embodiment, the reduced-cylinder operation is prohibited during the vehicle attitude control; however, the reduced-cylinder operation may not completely be prohibited during the vehicle attitude control. In other words, the reduced-cylinder operation may be prevented during the reduced-cylinder operation. For example, while the vehicle attitude control is performed, the operation state of the engine 10 may be made difficult to shift from the all-cylinder operation range B to the reduced-cylinder operation range A by changing the map of the operating range so that the reduced-cylinder operation range A is entirely or partially narrowed (see FIG. 4) compared to the case where the vehicle attitude control is not performed.

In the above embodiment, the present disclosure is applied to the engine 10 (four-cylinder engine) having two operation modes of the reduced-cylinder operation and the all-cylinder operation. With this engine 10, the reduced-cylinder operation mode is configured by suspending two of the cylinders 2A to 2D and operating the remaining two cylinders. In another example, the present disclosure may be applied to an engine having two or more operation modes as the reduced-cylinder operation. For example, in a case of applying to a six-cylinder engine, it is capable of achieving, in addition to an all-cylinder operation mode in which all the six cylinders are operated, two reduced-cylinder operation modes including a mode where two cylinders are suspended while the remaining four cylinders are operated and a mode where three cylinders are suspended while the remaining three cylinders are operated.

In the case where the present disclosure is applied to the engine having two or more reduced-cylinder operation modes as described above, the number of suspended cylinders may be limited during the vehicle attitude control. In one example, in the vehicle attitude control, suspension of only two cylinders may be allowed while suspension of three or more cylinders is prohibited.

Without limiting to preventing the reduced-cylinder operation of the engine 10 during the vehicle attitude control as described above, in another example, the combustion frequency of the engine 10 may be limited during the vehicle attitude control without taking into consideration the operation mode of the engine 10. In this example, the number of times that the combustion is performed in the engine 10 per unit time is counted (e.g., by using an in-cylinder pressure sensor, etc.), and during the vehicle attitude control, it is prevented that the counted number falls below than a given value. In one example, this given value may adopt a value of the combustion frequency used in the operating range of the engine 10 where the reduced-cylinder operation is performed (the range A in FIG. 4). In another example, the given value may adopt a value of the combustion frequency used in a particularly low engine speed part of the operating range where the reduced-cylinder operation is performed (a low engine speed part of the range A in FIG. 4). This is because, especially when the reduced-cylinder operation is performed on the low engine speed side, the combustion interval of the engine 10 becomes significantly long and the response degradation of the torque reduction due to the vehicle attitude control becomes distinctive.

In further another example, the given value may be set to be different between the reduced-cylinder operation and the all-cylinder operation (here, the reduced-cylinder operation may be allowed during the vehicle attitude control, instead of completely prohibiting it). For example, the given value may be set higher during the reduced-cylinder operation than during the all-cylinder operation. Thus, even when the reduced-cylinder operation is performed during the vehicle attitude control, the reduction of the combustion frequency of the engine 10 is suitably prevented and the response degradation of the torque reduction by the vehicle attitude control is prevented.

In still another example, instead of the operation mode or the combustion frequency of the engine 10, the engine speed may be limited during the vehicle attitude control. In this example, it may be prevented that the engine speed detected by the crank angle sensor 34 falls below a given speed during the vehicle attitude control. In one example, this given speed may adopt an engine speed corresponding to the operating range of the engine 10 where the reduced-cylinder operation is performed (the range A in FIG. 4). In another example, the given speed may adopt an engine speed corresponding to a particularly low engine speed part of the operating range where the reduced-cylinder operation is performed (a low engine speed part of the range A in FIG. 4). The reason for adopting this speed is as described above.

Figure 9:
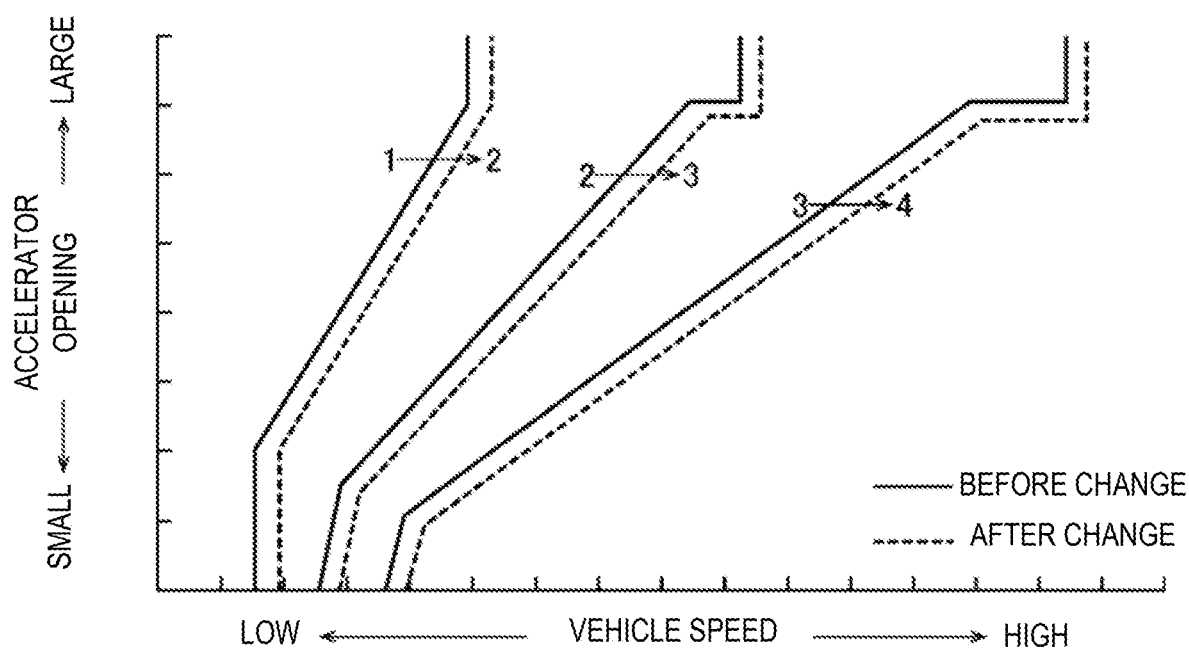
FIG. 9 is a transmission map for determining a gear position of an automatic transmission according to one modification of the present disclosure.
Figure 10:
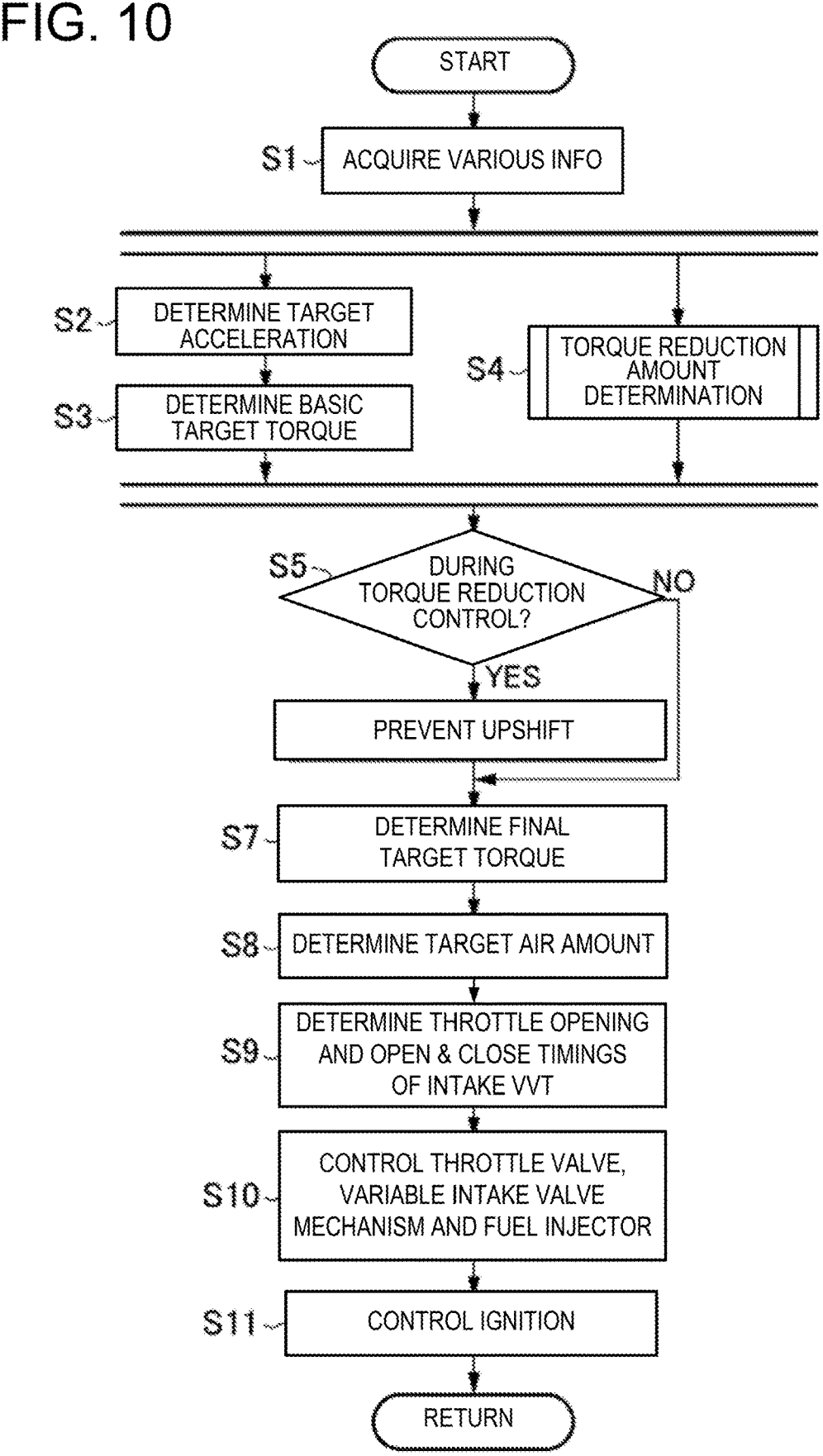
FIG. 10 is a flowchart illustrating an engine control according to one modification of the present disclosure.

In still further another example, an upshift of an automatic transmission of an AT vehicle during the vehicle attitude control may be prevented (see FIG. 10). This is because, since the combustion frequency of the engine per unit time also decreases when the transmission upshifts, the response degradation of the torque reduction may occur. In one example, a transmission condition for upshifting may be set stricter when the vehicle attitude control is performed than when the vehicle attitude control is not performed. This modification is described in detail with reference to FIG. 9.

FIG. 9 is a transmission map for determining a gear position of the automatic transmission according to this modification. In FIG. 9, the horizontal axis indicates the vehicle speed and the vertical axis indicates the accelerator opening, and the illustrated transmission map is used for upshifting (a transmission map used for downshifting is not illustrated). The solid line indicates a normal transmission map applied when the vehicle attitude control is not performed (a transmission map before the condition changed), and the dashed line indicates a transmission map applied when the vehicle attitude control is performed (a transmission map after the condition changed). In this modification, a transmission map obtained by shifting the normal transmission map to a higher vehicle speed side and a smaller accelerator opening side, that is, a transmission map shifted to a direction of less upshifting, is used during the vehicle attitude control. According to this modification, since the automatic transmission is less likely to be upshifted during the vehicle attitude control, the response degradation of the torque reduction by the vehicle attitude control is suitably prevented.

Note that without limiting to setting the stricter transmission condition for upshifting during the vehicle attitude control as illustrated in FIG. 9, the upshifting during the vehicle attitude control may completely be prohibited. The configuration for preventing the upshift of the automatic transmission during the vehicle attitude control as described above may be applied to an upshift of the transmission by a driver operation, such as an upshift by a manual transmission mode of an AT vehicle, an upshift of a manual transmission of an MT vehicle, etc. For example, when the driver performs an upshifting operation of the transmission during the vehicle attitude control, upshifting during the vehicle attitude control may be prevented by delaying the actual upshift of the transmission.

In the above embodiment, the vehicle attitude control is performed based on the steering angle and the steering rate. However, in another example, instead of the steering angle and the steering rate, the vehicle attitude control may be performed based on the yaw rate or a lateral acceleration. These steering angle, steering rate, yaw rate, and lateral acceleration are examples of the "steering angle related value."

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims

DESCRIPTION OF REFERENCE CHARACTERS

1 Intake Passage
2 (2A-2D) Cylinder
5 Throttle Valve
10 Engine
13 Fuel Injector
14 Ignition Plug
18 Variable Intake Valve Mechanism
20 Valve Stopping Mechanism
30 Accelerator Opening Sensor
39 Vehicle Speed Sensor
50 PCM (Power-train Control Module)
51 Vehicle Attitude Controlling Module
53 Preventing Module
100 Engine System

What is claimed is:

1. A vehicle control device, comprising:
an engine;
an engine control mechanism configured to control torque generated by the engine, the engine control mechanism being selected from the group consisting of a throttle valve, a fuel injector, an ignition plug, a variable intake valve, and a variable exhaust valve;
a processor; and
a computer readable memory storing software modules executable by the processor, the software modules comprising:
a vehicle attitude controlling module including instructions for controlling the engine control mechanism to perform a vehicle attitude control to reduce the torque so as to decelerate the vehicle when a condition that the vehicle is traveling and a steering angle related value that is related to a steering angle of a steering device increases is satisfied; and
a preventing module including instructions for controlling the engine control mechanism to prevent a combustion frequency of the engine from falling below a given value while the vehicle attitude controlling module executes the vehicle attitude control.

2. The vehicle control device of claim 1, wherein
the engine includes a plurality of cylinders and is switchable of an operation mode between a reduced-cylinder operation in which combustion in one or some of the plurality of cylinders is suspended and an all-cylinder operation in which combustion is performed in all of the plurality of cylinders, and
the preventing module sets the given value to be higher when the engine performs the reduced-cylinder operation than when the engine performs the all-cylinder operation.

3. The vehicle control device of claim 2, wherein the preventing module prohibits the combustion frequency from falling below the given value or prevents the engine from entering into an operating state where the combustion frequency falls below the given value.

4. The vehicle control device of claim 3, further comprising a steering angle sensor configured to detect the steering angle of the steering device,
wherein the vehicle attitude controlling module determines that the steering angle related value increases when a change rate of the detected steering angle is higher than a given rate.

5. The vehicle control device of claim 2, further comprising a steering angle sensor configured to detect the steering angle of the steering device,
wherein the vehicle attitude controlling module determines that the steering angle related value increases when a change rate of the detected steering angle is higher than a given rate.

6. The vehicle control device of claim 1, further comprising an engine speed detector configured to detect a speed of the engine,
wherein the preventing module prevents the combustion frequency from falling below the given value by preventing the detected engine speed from falling below a given speed.

7. The vehicle control device of claim 6, wherein the preventing module prohibits the combustion frequency from falling below the given value or prevents the engine from entering into an operating state where the combustion frequency falls below the given value.

8. The vehicle control device of claim 7, further comprising a steering angle sensor configured to detect the steering angle of the steering device,
wherein the vehicle attitude controlling module determines that the steering angle related value increases when a change rate of the detected steering angle is higher than a given rate.

9. The vehicle control device of claim 6, further comprising a steering angle sensor configured to detect the steering angle of the steering device,
wherein the vehicle attitude controlling module determines that the steering angle related value increases when a change rate of the detected steering angle is higher than a given rate.

10. The vehicle control device of claim 1, wherein
the engine includes a plurality of cylinders and has an operation mode of a reduced-cylinder operation in which combustion in one or some of the plurality of cylinders is suspended, and
the preventing module prevents the combustion frequency from falling below the given value by preventing the reduced-cylinder operation of the engine.

11. The vehicle control device of claim 10, wherein the preventing module prohibits the combustion frequency from falling below the given value or prevents the engine from entering into an operating state where the combustion frequency falls below the given value.

12. The vehicle control device of claim 11, further comprising a steering angle sensor configured to detect the steering angle of the steering device,
wherein the vehicle attitude controlling module determines that the steering angle related value increases when a change rate of the detected steering angle is higher than a given rate.

13. The vehicle control device of claim 10, further comprising a steering angle sensor configured to detect the steering angle of the steering device,
wherein the vehicle attitude controlling module determines that the steering angle related value increases when a change rate of the detected steering angle is higher than a given rate.

14. The vehicle control device of claim 1, wherein the preventing module prohibits the combustion frequency from falling below the given value or prevents the engine from entering into an operating state where the combustion frequency falls below the given value.

15. The vehicle control device of claim 14, further comprising a steering angle sensor configured to detect the steering angle of the steering device,
wherein the vehicle attitude controlling module determines that the steering angle related value increases when a change rate of the detected steering angle is higher than a given rate.

16. The vehicle control device of claim 1, further comprising an automatic transmission provided on a driving force transmission path extending between the engine and steerable wheels of the vehicle,
wherein the preventing module prevents the combustion frequency from falling below the given value by preventing the automatic transmission from upshifting.

17. The vehicle control device of claim 16, further comprising a steering angle sensor configured to detect the steering angle of the steering device,
wherein the vehicle attitude controlling module determines that the steering angle related value increases when a change rate of the detected steering angle is higher than a given rate.

18. The vehicle control device of claim 1, further comprising a steering angle sensor configured to detect the steering angle of the steering device,
wherein the vehicle attitude controlling module determines that the steering angle related value increases when a change rate of the detected steering angle is higher than a given rate.

19. A vehicle control device, comprising:
an engine;
an engine control mechanism configured to control torque generated by the engine, the engine control mechanism being selected from the group consisting of a throttle valve, a fuel injector, an ignition plug, a variable intake valve, and a variable exhaust valve;
a processor; and
a computer readable memory storing software modules executable by the processor, the software modules comprising:
a vehicle attitude controlling module including instructions for controlling the engine control mechanism to perform a vehicle attitude control to reduce the torque so as to decelerate the vehicle when a condition that the vehicle is traveling and a steering angle related value that is related to a steering angle of a steering device increases is satisfied; and
a preventing module including instructions for controlling the engine control mechanism to prevent an engine speed from falling below a given speed while the vehicle attitude controlling module executes the vehicle attitude control.

20. A vehicle control device, comprising:
an engine including a plurality of cylinders and having an operation mode of a reduced-cylinder operation in which combustion in one or some of the plurality of cylinders is suspended;
an engine control mechanism configured to control torque generated by the engine, the engine control mechanism being selected from the group consisting of a throttle valve, a fuel injector, an ignition plug, a variable intake valve, and a variable exhaust valve;
a processor; and
a computer readable memory storing software modules executable by the processor, the software modules comprising:
a vehicle attitude controlling module including instructions for controlling the engine control mechanism to perform a vehicle attitude control to reduce the torque so as to decelerate the vehicle when a condition that the vehicle is traveling and a steering angle related value that is related to a steering angle of a steering device increases is satisfied; and
a preventing module including instructions for controlling the engine control mechanism to prevent that the engine performs the reduced-cylinder operation while the vehicle attitude controlling module executes the vehicle attitude control.

* * * * *